(12) United States Patent
Tsuji et al.

(10) Patent No.: US 12,325,202 B2
(45) Date of Patent: Jun. 10, 2025

(54) METHOD AND SYSTEM FOR INSPECTING QUALITY OF TIRE MEMBER

(71) Applicant: The Yokohama Rubber Co., LTD., Kanagawa (JP)

(72) Inventors: Mitsuo Tsuji, Kanagawa (JP); Yuichiro Hisada, Kanagawa (JP); Satoshi Onodera, Kanagawa (JP); Atsushi Iwai, Shiga (JP); Kousuke Shimada, Tokyo (JP); Takeshi Yokoji, Tokyo (JP); Kenta Ishii, Tokyo (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/850,911

(22) PCT Filed: Dec. 26, 2022

(86) PCT No.: PCT/JP2022/047868
§ 371 (c)(1),
(2) Date: Sep. 25, 2024

(87) PCT Pub. No.: WO2023/188646
PCT Pub. Date: Oct. 5, 2023

(65) Prior Publication Data
US 2025/0108576 A1 Apr. 3, 2025

(30) Foreign Application Priority Data
Mar. 31, 2022 (JP) .................................. 2022-059703

(51) Int. Cl.
*G01N 23/04* (2018.01)
*B29D 30/00* (2006.01)
(Continued)

(52) U.S. Cl.
CPC ......... *B29D 30/0061* (2013.01); *G01N 23/04* (2013.01); *G01N 23/083* (2013.01);
(Continued)

(58) Field of Classification Search
CPC ............ B29D 30/0061; B29D 30/0016; B29D 2030/0066; G01N 23/04; G01N 23/083; G01N 23/185; G01N 2223/645
See application file for complete search history.

(56) References Cited

U.S. PATENT DOCUMENTS

| | | | |
|---|---|---|---|
| 2003/0067597 A1* | 4/2003 | Ashimoto | .......... G01N 21/8914 356/237.1 |
| 2005/0175146 A1* | 8/2005 | Uchida | .................. G01N 23/04 378/61 |

FOREIGN PATENT DOCUMENTS

| | | |
|---|---|---|
| JP | H07-294458 A | 11/1995 |
| JP | 8-86635 A | 4/1996 |

(Continued)

*Primary Examiner* — Courtney D Thomas
(74) *Attorney, Agent, or Firm* — Thorpe North & Western (57) ABSTRACT

To determine the magnitude of variation in predetermined quality in a longitudinal direction of an elongated tire member formed by bonding a plurality of types of constituent members, X-rays are applied to a predetermined length range of a tire member, which is elongated, from a top surface side of the tire member while conveying the tire member in a longitudinal direction using a conveying device to acquire image data based on X-ray transmittance of the predetermined length range. The image data is input into a calculation device. Based on contrast in the image data, the magnitude of variation in the dimension in the width direction of a constituent member in the longitudinal direction is calculated by the calculation device, the constituent member being formed of unvulcanized rubber having a larger mass and a higher content rate of a specific component in the tire member.

7 Claims, 9 Drawing Sheets

(51) Int. Cl.
   *G01N 23/083* (2018.01)
   *G01N 23/18* (2018.01)
(52) U.S. Cl.
   CPC ....... *G01N 23/185* (2013.01); *B29D 30/0016* (2013.01); *B29D 2030/0066* (2013.01); *G01N 2223/645* (2013.01)

(56) References Cited

FOREIGN PATENT DOCUMENTS

| | | |
|---|---|---|
| JP | 2010-217119 A | 9/2010 |
| JP | 2017-081545 A | 5/2017 |

\* cited by examiner

METHOD AND SYSTEM FOR INSPECTING QUALITY OF TIRE MEMBER

TECHNICAL FIELD

The present technology relates to a method and a system for inspecting quality of a tire member and particularly to a method and a system for inspecting quality of a tire member that make it possible to quickly and accurately determine or identify the magnitude of variation in predetermined quality in a longitudinal direction of an elongated tire member formed by bonding a plurality of types of constituent members.

BACKGROUND ART

Tires are manufactured by using various elongated tire members. Some of these tire members are formed by bonding a plurality of types of constituent members such as different types of rubber and reinforcing materials. In a tire manufacturing line, various inspections are performed to determine quality of these tire members.

As a known device for inspecting quality of a tire member, a measuring device configured to determine the shape, dimensions, and the like of each constituent member in a cross-section of the tire member without stopping a manufacturing line has been proposed (see Japan Unexamined Patent Publication No. H08-086635 A). In this proposed measuring device, buffer means (a festoon mechanism) that accumulates tire members is disposed on a conveyance path including a transfer system such as a belt conveyor configured to convey the tire members, and a CT scanner is disposed on the downstream side of the buffer means. During inspection of the inside of the tire member by the CT scanner, the conveyance is temporarily stopped for a portion corresponding to an inspection range of the tire member. On the other hand, the extruder disposed on the upstream side of the buffer means continues to extrude tire members, and the extruded tire members are temporarily accumulated by the buffer means. Thus, the manufacturing line is avoided from being stopped without interrupting the extrusion of the tire members by the extruder even during the inspection of the tire members by the CT scanner on the conveyance path.

In the measuring device proposed in Japan Unexamined Patent Publication No. H08-086635 A, in order to accurately determine the magnitude of variation in predetermined quality of the tire member in a longitudinal direction, it is necessary to subdivide the tire member into a large number of sections in the longitudinal direction without gaps, temporarily stop the conveyance, and inspect each of the subdivided sections by using the CT scanner. As a result, it takes quite a substantial amount of time to convey the inspected tire member through the conveyance path to the next step. On the other hand, in a case where the sections in which inspection is performed are thinned out in order to reduce the number of times of temporarily stopping of the conveyance of the tire member toward the downstream side of the CT scanner in association with the inspection by the CT scanner, the magnitude of variation in the predetermined quality of the tire member in the longitudinal direction cannot be accurately determined. As a result, there is room for improvement in quickly and accurately determining the magnitude of variation in the predetermined quality of the tire member in the longitudinal direction.

SUMMARY

A quality inspection method for a tire member according to an aspect of the present technology is a quality inspection method for a tire member for determining predetermined quality of a tire member that is elongated and that is formed by bonding a plurality of types of constituent members, the quality inspection method including: continuously performing a process of applying X-rays to a predetermined length range of the tire member from a top surface side of the tire member while conveying the tire member in a longitudinal direction to acquire image data based on X-ray transmittance of the predetermined length range; acquiring the image data of the predetermined length range continuous without gaps in the longitudinal direction; and determining, based on contrast in each piece of the image data acquired, a magnitude of variation in the predetermined quality of the tire member in the longitudinal direction.

A quality inspection system for a tire member according to an aspect of the present technology is a quality inspection system for determining predetermined quality of a tire member that is elongated and that is formed by bonding a plurality of types of constituent members, the quality inspection system including: a conveying device configured to convey the tire member in a longitudinal direction; an X-ray inspection device configured to apply X-rays to a predetermined length range of the tire member from a top surface side of the tire member being conveyed by the conveying device to acquire image data based on X-ray transmittance of the predetermined length range; and a calculation device to which the image data is input, the quality inspection system being configured such that a process of acquiring the image data is continuously performed, the image data of the predetermined length range continuous without gaps in the longitudinal direction is acquired, and based on contrast in each piece of the image data acquired, a magnitude of variation in the predetermined quality of the tire member in the longitudinal direction is calculated by the calculation device.

According to the present technology, the image data acquired by applying the X-rays to the predetermined length range of the tire member from the top surface side of the tire member while conveying the tire member in the longitudinal direction is used, and thus it is not necessary to stop the conveyance of the tire member in order to determine the predetermined quality. The image data of the predetermined length range continuous without gaps in the longitudinal direction is acquired, and the predetermined quality can be accurately determined based on the contrast in each piece of the acquired image data. As a result, it is advantageous to quickly and accurately determine the magnitude of variation in the predetermined quality of the tire member in the longitudinal direction.

DETAILED DESCRIPTION

A method and a system for inspecting quality of a tire member according to an embodiment of the present technology will be described below with reference to drawings.

Figure 2:
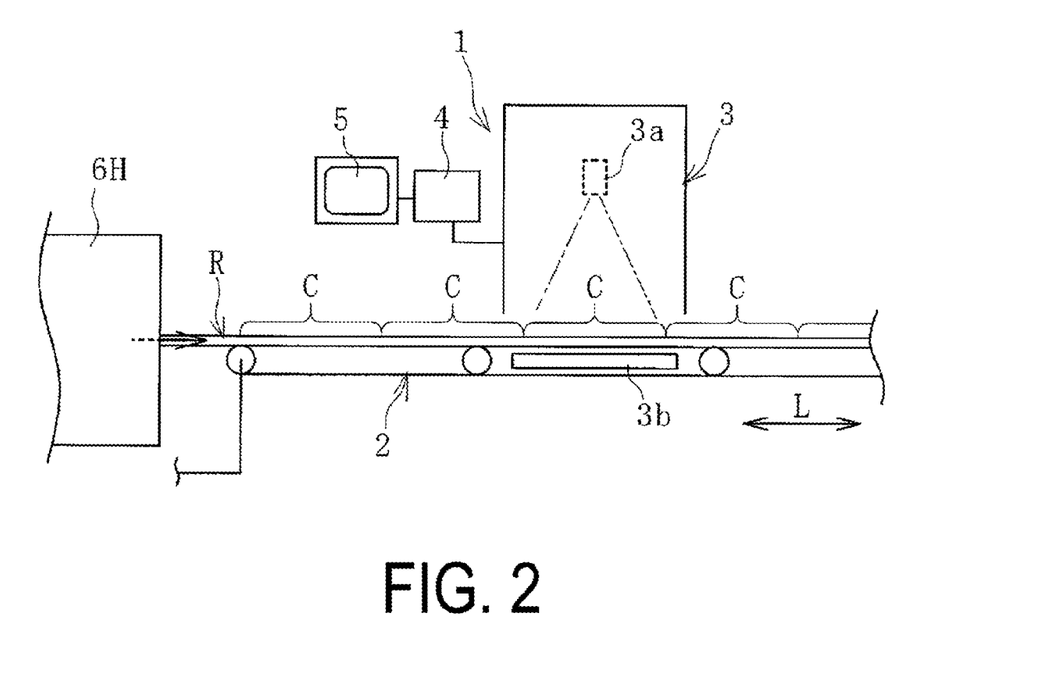
FIG. 2 is an enlarged explanatory diagram illustrating the surroundings of an X-ray inspection device of FIG. 1.
Figure 3:
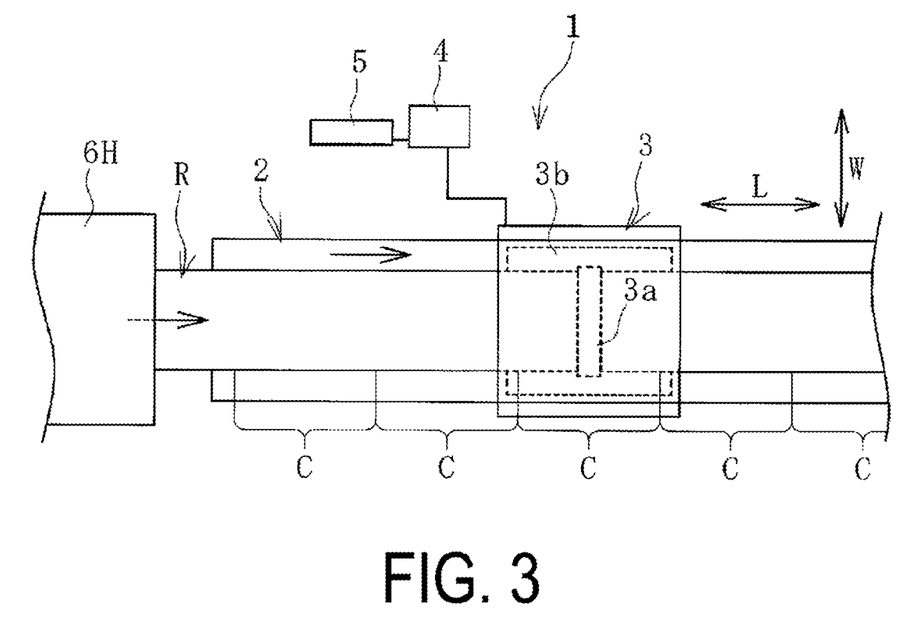
FIG. 3 is an explanatory diagram illustrating the range illustrated in FIG. 2 in a plan view.

An embodiment of a quality inspection system 1 (hereinafter, referred to as a system 1), illustrated in FIGS. 1 to 3, for a tire member is used for determining the magnitude of variation in predetermined quality of a tire member R in a longitudinal direction L, the tire member R being elongated. An arrow L and an arrow W in the drawing respectively indicate a longitudinal direction and a width direction of the tire member R.

Figure 4:
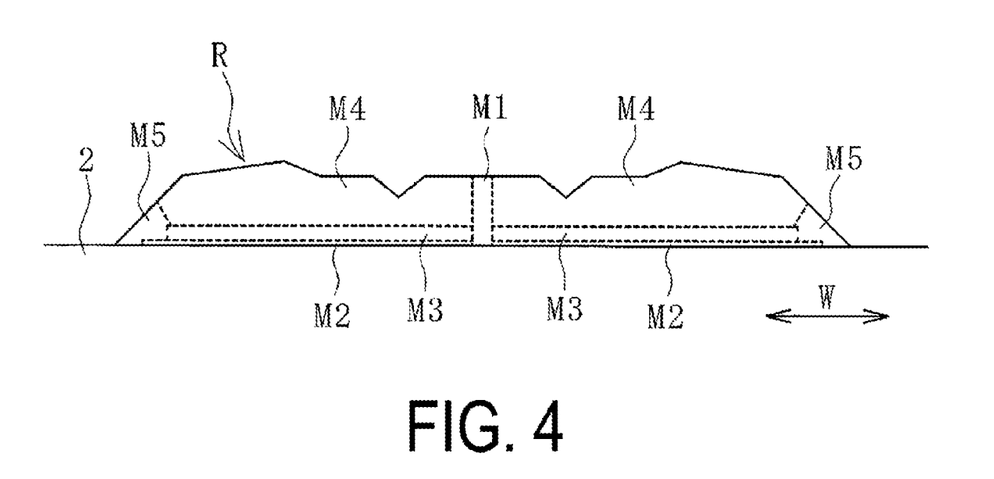
FIG. 4 is an explanatory diagram illustrating a tire member to be inspected in a cross-sectional view.
Figure 5:
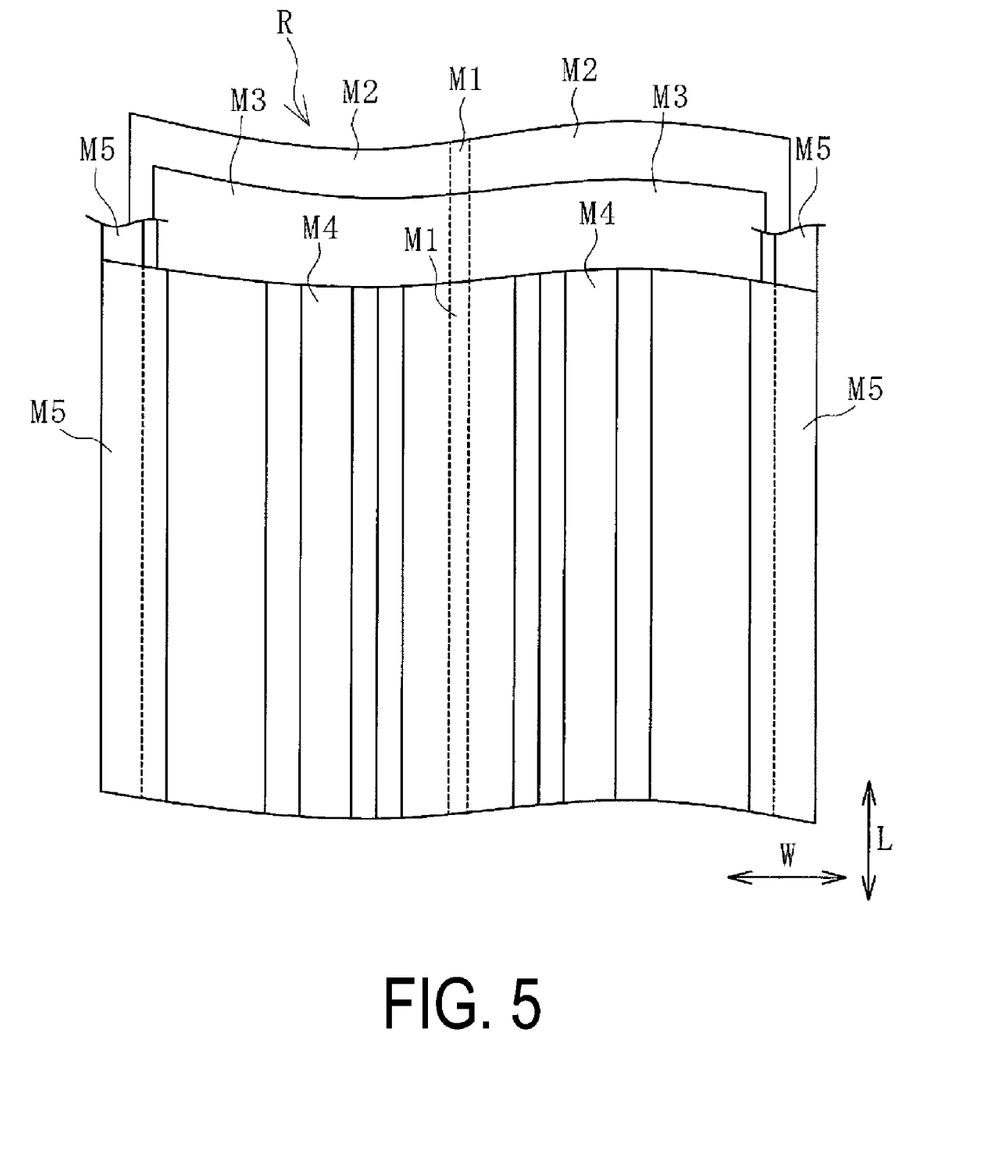
FIG. 5 is an explanatory diagram illustrating a partial cut-out of the tire member of FIG. 4 in a plan view.

The elongated tire member R formed by bonding a plurality of types of constituent members M (M1 to M5) as illustrated in FIGS. 4 and 5 is a member to be inspected. In this embodiment, the tire member R to be inspected is a tread rubber in which the constituent members M1 to M5 made of unvulcanized rubber respectively extruded by a plurality of extruders 6 (6a to 6e) are bonded. The tire member R to be inspected is not limited to the tread rubber but may be a variety of known members mainly made of rubber such as side rubber and used for manufacturing a tire.

The constituent members M1 to M5 are different types of unvulcanized rubber, which corresponds to, for example, a case where different compounding agents are blended into the same type of raw rubber, a case where the same compounding agents are blended into the same type of raw rubber in different blended amounts, a case where different compounding agents are blended into different types of raw rubber, and a case where the same compounding agents are blended into different types of raw rubber in different blended amounts.

The number of types of constituent members M is not limited to five as long as there are a plurality of types. For example, the number of types of constituent members M is about two or more and eight or less. There is not only a case where all the constituent members M are made of unvulcanized rubber but also a case where some of the constituent members M are a reinforcing material (reinforcing cord or the like). The size of the tire member R is not particularly limited; however, the length is, for example, several meters or more and some hundreds of meters or less, the width is, for example, 10 mm or more and 2000 mm or less, and the thickness (maximum thickness) is, for example, 0.3 mm or more and 100 mm or less.

In the tire member R illustrated in FIGS. 4 and 5, the sheet-shaped constituent members M2 and M3 are vertically layered, the constituent member M4 is layered thereon, and the constituent member M5 covering both end portions in the width direction of the constituent members M2 and M3 is layered on both end portions in the width direction. At the central portion of the tire member R in the width direction, the constituent member M1 extends through the tire member R vertically (in a thickness direction). The constituent members M1, M4, and M5 are exposed on the top surface of the tire member R, and the constituent members M1, M2, and M5 are exposed on the back surface of the tire member R. The tire member R is placed on a conveying device 2 with the back surface in contact with the conveying device 2. When the tire member R is a non-defective product, each of the constituent members M1 to M5 extends substantially over the entire length in the longitudinal direction L in the cross-sectional shape illustrated in FIG. 4. In the drawing, boundaries between the constituent members M are indicated by dashed lines.

The constituent member M1 is an earth tread rubber containing a large amount of carbon black and no silica. The constituent member M1 is a member having a substantially rectangular cross-section, having the largest thickness among the constituent members M, and having the highest content rate (weight ratio) of carbon black and the smallest specific gravity (density) among the constituent members M. The dimension in the width direction of the constituent member M1 is, for example, 0.5 mm or more and 50 mm or less.

The constituent member M2 is an adhesive rubber containing carbon black and containing no silica or a small amount of silica, and is the thinnest sheet-shaped member among the constituent members M. The constituent member M3 is an undertread rubber containing carbon black and containing no silica or a small amount of silica, and is a sheet-shaped member thicker than the constituent member M2.

The constituent member M4 is a cap rubber containing a large amount of silica instead of carbon black and containing no carbon black or a small amount of carbon black. The constituent member M4 is the second thickest member after the constituent member M1 among the constituent members M, and has recessed and protruded portions extending in the longitudinal direction L on the surface thereof and different thicknesses depending on positions in the width direction. The constituent member M5 is an end portion rubber containing carbon black and no silica. The constituent member M5 forms an inclined surface of an end surface in the width direction of the tire member R, and has different thicknesses depending on positions in the width direction.

The constituent members M1 to M5 have different specific gravities (densities), and the respective specific gravities (mean values) are determined in advance. Of the constituent members M, the constituent member M4 in which the largest amount of silica is remarkably blended has a large specific gravity compared to the other constituent members M1, M2, M3, and M5. Each of the constituent members M may contain other known components depending on the required performance. Containing no component as described above means not only a case where the component is not contained at all but also a case where a very small amount of the component is contained.

The system 1 includes the conveying device 2, an X-ray inspection device 3, and a calculation device 4. A monitor 5 is communicably connected to the calculation device 4. The extruder 6 is disposed on the upstream side of the conveying device 2 in the conveying direction, and a winding machine 7 and a discharge conveyor 10 are arranged side by side via a sorting conveyor 9 on the downstream side in the conveying direction. On the downstream side of the X-ray inspection device 3 in the conveying direction of the conveying device 2, a cutting machine 8 is disposed above the conveying device 2.

The conveying device 2 conveys the tire member R in the longitudinal direction L. Various known specifications such as a belt conveyor device and a roller conveyor device in which a large number of rotary rollers are arranged can be adopted as the conveying device 2.

The X-ray inspection device 3 includes an irradiation unit 3a and a light receiving unit 3b. The irradiation unit 3a is disposed above the tire member R placed on the conveying device 2, and the light receiving unit 3b is disposed below the tire member R. Thus, the tire member R being conveyed by the conveying device 2 passes between the irradiation unit 3a and the light receiving unit 3b in the vertical direction.

The irradiation unit 3a applies X-rays to a predetermined length range C of the tire member R from a top surface side (upper side in the drawing) of the tire member R being conveyed by the conveying device 2 such that the entire width of the tire member R can be covered. The X-rays transmitted through the tire member R are received by the light receiving unit 3b. Then, image data D based on the X-ray transmittance of the predetermined length range C of the tire member R to which the X-rays are applied is acquired by the X-ray inspection device 3. The X-ray inspection device 3 having various known specifications can be employed.

The irradiation unit 3a continuously or intermittently applies X-rays to acquire each piece of the image data D of the predetermined length range C continuous in the longitudinal direction L. The predetermined length ranges C adjacent to each other in the longitudinal direction L may slightly overlap each other in the longitudinal direction L, but are not separated from each other in the longitudinal direction L. In applying X-rays intermittently, as the conveyance speed of the tire member R by the conveying device 2 is higher or as the predetermined length range C is smaller, the interval becomes shorter and the X-rays are frequently applied. In other words, the lower the conveyance speed by the conveying device 2 is or the larger the predetermined length range C is, the longer the interval at which the X-rays are intermittently applied is.

The size (length) of the predetermined length range C and the conveyance speed by the conveying device 2 can be arbitrarily set, but the size of the predetermined length range C is, for example, about 50 mm (5 mm or more and 1000 mm or less). The conveyance speed by the conveying device 2 is, for example, about 50 mm/s or more and 1000 mm/s or less. A preliminary test or the like is performed and thereby the X-ray irradiation intensity (voltage and current of an X-ray tube) is set to a range in which clearer image data D can be acquired in accordance with the specification of the tire member R to be inspected.

The image data D acquired by the X-ray inspection device 3 is sequentially input to the calculation device 4. Various pieces of other data are input to the calculation device 4, and various computational operations are performed by using the installed program. A known computer or the like can be used as the calculation device 4. The calculation device 4 may be provided separately from the X-ray inspection device 3 or may be incorporated as a part of the X-ray inspection device 3.

The image data D acquired by the X-ray inspection device 3 and data (image data and the like) on which computational processing is performed by the calculation device 4 are displayed on the monitor 5. Various known specifications may be employed as the monitor 5.

The extruder 6 (6a to 6e) includes a cylinder in which a rotationally driven screw is disposed. The extruder 6 rotates the screw to feed unvulcanized rubber in which raw rubber and various compounding agents are kneaded to an appropriate viscosity and extrudes the unvulcanized rubber from an extruding head 6H. The extruder 6 having various known specifications can be employed. In this embodiment, since the tire member R is formed of five types of bonded constituent members M1 to M5, five of the extruders 6a to 6e are used. Different types of unvulcanized rubbers, which form the corresponding constituent members M1, M2, M3, M4, and M5, are respectively extruded from the extruders 6a, 6b, 6c, 6d, and 6e. The respective unvulcanized rubbers extruded by the extruders 6a to 6e pass through the extruding head 6H to be bonded and extruded as the integrated tire member R from the extruding head 6H.

The winding machine 7 winds and temporarily stocks the tire member R conveyed by the conveying device 2. The winding machine 7 includes a take-up drum configured to wind the tire member R together with a liner. In a direct extrusion and molding line or the like in which the manufactured tire member R is used immediately in the next step, the winding machine 7 is not necessary.

The cutting machine 8 cuts across the tire member R placed on the conveying device 2. A known cutter such as a rotary round blade is employed as the cutting machine 8.

The sorting conveyor 9 pivots upward and downward about one end portion (an upstream end portion in the conveying direction). The tire member R conveyed by the conveying device 2 is guided to the winding machine 7 when the other end portion of the sorting conveyor 9 pivots downward, and is guided to the discharge conveyor 10 when the other end portion of the sorting conveyor 9 pivots upward.

Hereinafter, an example of a procedure of determining the magnitude of variation in the predetermined quality of the tire member R in the longitudinal direction L by a quality inspection method of the present technology will be described. First, a case will be described in which the distribution in the longitudinal direction L of the dimension in the width direction of the constituent member M1 formed of unvulcanized rubber having a higher content rate of a specific component (carbon black) than those of the other constituent members M1 to M5 is determined as the predetermined quality.

Figure 1:
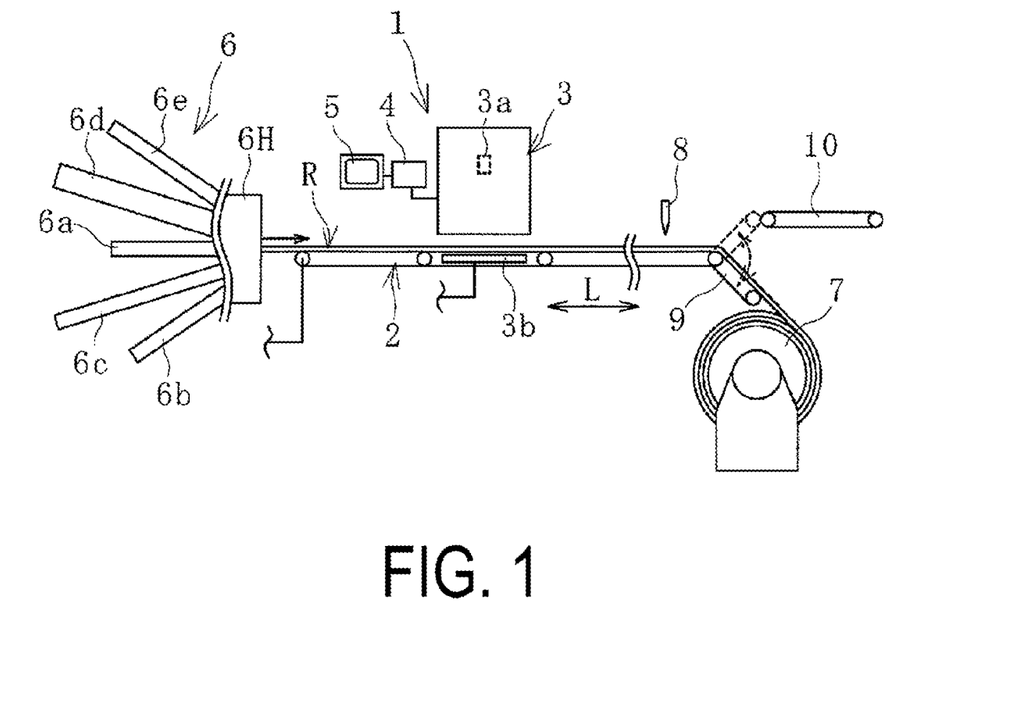
FIG. 1 is an explanatory diagram illustrating an embodiment of a quality inspection system for a tire member in a side view.

As illustrated in FIG. 1, the tire member R extruded from the extruder 6 through the extruding head 6H is placed on the conveying device 2 disposed on the front side and is conveyed in the longitudinal direction L. In this conveying process, as illustrated in FIGS. 2 and 3, X-rays are applied by the irradiation unit 3a from the top surface side of the tire member R to a predetermined length range C toward the top surface of the tire member R while the tire member R is conveyed in the longitudinal direction L. The X-rays transmitted through the predetermined length range C of the tire member R are sequentially received by the light receiving unit 3b.

Figure 6:
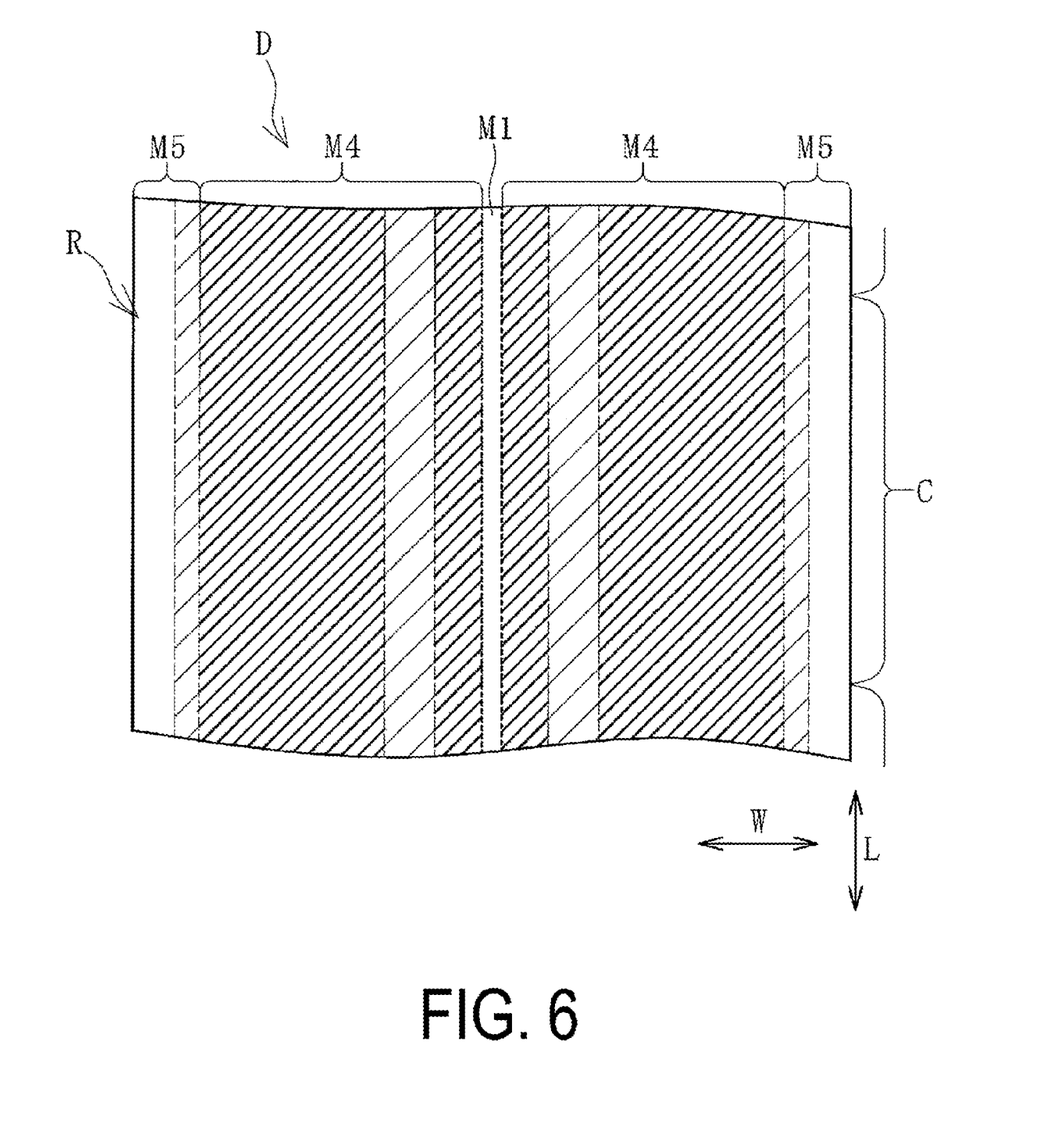
FIG. 6 is an explanatory diagram illustrating image data acquired by the X-ray inspection device of FIG. 1.

Thus, the image data D illustrated in FIG. 6 based on the X-ray transmittance of the predetermined length range C is acquired by the X-ray inspection device 3. Continuously performing a process of acquiring the image data D as just described allows the image data D of the predetermined length range C continuous without gaps in the longitudinal direction L to be acquired. Each piece of the acquired image data D is sequentially input to the calculation device 4, subjected to computational processing, and analyzed. The calculation device 4 calculates, based on the contrast in the image data D, the magnitude of variation (degree of variation) in the dimension in the width direction of the constituent member M1 in the longitudinal direction L. The calculation process by the calculation device 4 will be described in detail below.

The X-rays applied from the irradiation unit 3a pass through the tire member R and are received by the light receiving unit 3b. As the thickness of the tire member R increases, the attenuation of the X-rays in the tire member R increases more (the amount of absorption increases), and thus the amount of X-rays received by the light receiving unit 3b (the amount of transmitted X-rays) decreases. When the content of components that easily attenuate X-rays (having high atomic numbers and densities) in the tire member R is high, the amount of X-rays received by the light receiving unit 3b (the amount of transmitted X-rays) decreases. Accordingly, the acquired image data D becomes darker and closer to black. On the other hand, as the thickness of the tire member R decreases, the attenuation of the X-rays in the tire member R decreases more (the amount of absorption decreases), and thus the amount of X-rays received by the light receiving unit 3b (the amount of transmitted X-rays) increases. When the content of components that easily attenuate X-rays in the tire member R is small, the amount of X-rays received by the light receiving unit 3b (the amount of transmitted X-rays) increases. Accordingly, the acquired image data D becomes lighter and closer to white.

Silica is a component that significantly attenuates (absorbs) X-rays as compared with carbon black. Consequently, the image data D of the constituent member M containing silica or having a large content of silica is closer to black and darker than that of the constituent member M containing carbon black instead of silica or having a large content of carbon black. As described above, the contrast in the image data D depends on the thickness and the contained component of the tire member R at the position through which the X-rays pass.

Figure 7:
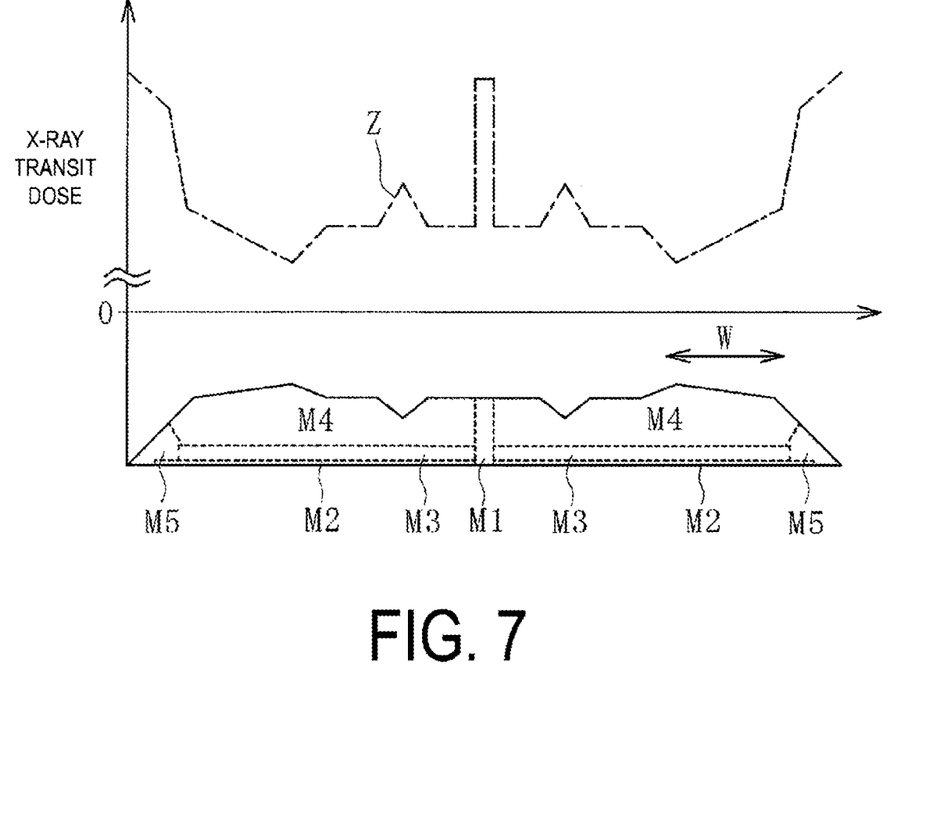
FIG. 7 is a graph illustrating the transit dose of X-rays of the tire member of FIG. 4 at a position in the width direction.

As illustrated by a dot-dash line Z in FIG. 7, a transit dose Z of X-rays of the tire member R changes in the width direction W. In FIG. 7, in order to make it easy to understand the position of the tire member R in the width direction, a transverse cross-sectional view of the tire member R is illustrated below the graph. The transit dose Z indicates the amount of X-rays received on the back surface side when the X-rays are applied from the top surface side of the tire member R. The transit dose Z can be calculated based on the thickness, specific gravity, and attenuation coefficient of the tire member R at the position through which the X-rays pass. The larger the transit dose Z is at the position in the width direction, the darker the color of the image data D is.

Consequently, in the image data D illustrated in FIG. 6, the color is darkest at the thickest position of the constituent member M4, and the color is lightest at the thinnest position. Since the constituent member M1 is the thickest member but has the smallest specific gravity, the color of the image data D is lighter at the position where the constituent member M1 is disposed. At the position where the constituent member M5 is disposed, the color of the image data D becomes lighter toward the end of the tire member R in the width direction. In FIG. 6, the arrangement pitch of diagonal lines is changed in accordance with the color density, and the arrangement pitch of diagonal lines is reduced and densely illustrated in a portion, the color of which is relatively dark.

Thus, in the image data D of FIG. 6, there are dark portions and light portions, and the light portions are present at a plurality of positions (the thinnest position of the constituent member M4, the position of the constituent member M1, and the position of the constituent member M5). As a result, it is difficult to identify which light portion is the position where the constituent member M1 exists only by simple contrast in the image data D. However, in a case where the thickness changes in the same type of unvulcanized rubber, the change of the transit dose Z gradually changes in the same manner as the change of the thickness, and thus the contrast in the image data D gently changes. On the other hand, in the case of different types of unvulcanized rubber, the transit dose Z largely changes due to the difference in the contained components, and thus the contrast in the image data D rapidly changes.

Accordingly, in this embodiment, the transit dose Z in the width direction W of the tire member R illustrated in FIG. 7 is determined in advance, and the magnitude of the difference in the transit dose Z is used. In other words, the transit dose Z of each constituent member M is determined in advance, and as illustrated in FIG. 7, a reference range of the magnitude of the difference between the transit doses Z of the constituent members M at the boundary between the constituent members M adjacent to each other in the width direction W is set. In other words, if the change in the transit dose Z in the width direction W is within the reference range, the reference range is set so as to substantially ensure that the constituent members M1 and M4 are adjacent to each other in the width direction W.

Then, the range of the difference in contrast of the image data D corresponding to the set reference range is stored in the calculation device 4 as a determination reference. The calculation device 4 calculates the magnitude of the difference in contrast in the width direction W with respect to each piece of the image data D. When detecting a position where the difference falls within the determination criterion, the calculation device 4 determines that the detected position in the width direction is the boundary between the constituent members M1 and M4. When one constituent member M1 extends in the longitudinal direction L in the tire member R, the boundary between the constituent members M1 and M4 is detected at two locations spaced apart from each other in the width direction W. The distance between the boundaries in the width direction W is calculated as the dimension in the width direction of the constituent member M1.

Figure 8:
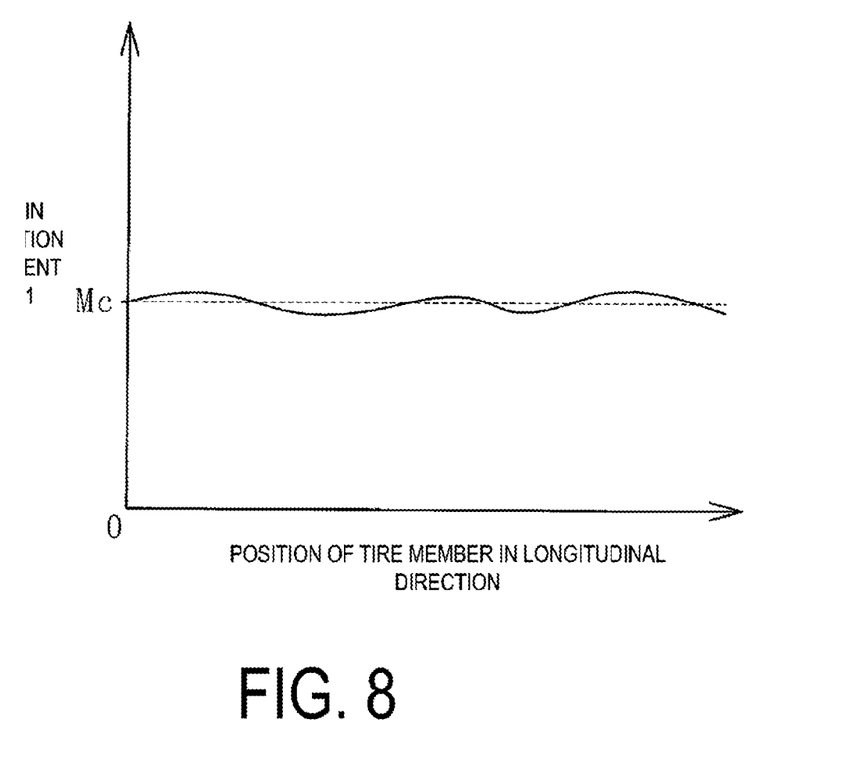
FIG. 8 is a graph illustrating the distribution in the longitudinal direction of a dimension in a width direction of a constituent member M1.

As a result, as illustrated in FIG. 8, the magnitude of variation in the dimension in the width direction of the constituent member M1 of the tire member R in the longitudinal direction L is calculated. Mc on the vertical axis of FIG. 8 indicates a design value of the dimension in the width direction of the constituent member M1, and it can be determined how much the dimension in the width direction of the constituent member M1 varies in the longitudinal direction L in the manufactured tire member R. When the dimension in the width direction is 0 in FIG. 8, it means that the constituent member M1 is interrupted in the middle of the longitudinal direction L. Thus, according to the data of FIG. 8, the continuity of the constituent member M1 in the longitudinal direction L can be determined.

As the quality confirmation result, for example, a portion where it is determined that the constituent member M1 exists on the image data D of FIG. 6 (the region of the interval in the width direction W between the aforementioned boundaries) can be displayed in an easily visible color (yellow, light blue, or the like) on the monitor 5. Thus, the person concerned can immediately determine the quality confirmation result by looking at the monitor 5.

In this embodiment, the X-rays are applied by the irradiation unit 3a to the predetermined length range C of the tire member R so as to cover the entire width of the tire member R; however, the position in the width direction at which the constituent member M1 is disposed in the tire member R is determined in advance. Consequently, the range in the width direction in which the X-rays are applied can be set to a narrower range including a position previously determined as the position in the width direction at which the constituent member M1 is disposed.

When the magnitude of the calculated variation in the dimension in the width direction of the constituent member M1 in the longitudinal direction L is within the predetermined allowable range, the corresponding predetermined length range C is determined to be a non-defective portion. Then, the non-defective portion of the tire member R conveyed by the conveying device 2 is guided by the sorting conveyor 9 to the winding machine 7 to be wound thereby. In the case of a direct extrusion and molding line or the like, the non-defective portion of the tire member R is conveyed to the next step as it is.

When the magnitude of the calculated variation in the dimension in the width direction of the constituent member M1 in the longitudinal direction L is out of the allowable range, the corresponding predetermined length range C (defective portion) is cut by the cutting machine 8 on the conveying device 2. Then, when the cut predetermined length range C (defective portion) is conveyed to the downstream end portion of the conveying device 2 in the conveying direction, the sorting conveyor 9 pivots toward the discharge conveyor 10. As a result, the cut predetermined length range C (defective portion) is placed and conveyed on the discharge conveyor 10, and then is removed from the manufacturing line.

As described above, the image data D acquired by applying the X-rays to the predetermined length range C from the top surface side of the tire member R being conveyed in the longitudinal direction L by the conveying device 2 is used, and thus it is not necessary to stop the conveyance of the tire member R in order to determine the dimension in the width direction of the constituent member M1. Then, the image data D of the predetermined length range C continuous without gaps in the longitudinal direction L is acquired, and the dimension in the width direction of the constituent member M1 can be accurately determined by the calculation device 4 based on the contrast of each piece of the image data D. As a result, it is advantageous to quickly and accurately determine variation in the dimension in the width direction of the constituent member M1 in the longitudinal direction L (i.e., the continuity of the constituent member M1 in the longitudinal direction L).

In the embodiment described above, the case where the distribution in the longitudinal direction of the constituent member M1 formed of unvulcanized rubber having a higher content rate of carbon black as a specific component than those of unvulcanized rubber forming the other constituent members M is determined is illustrated as an example. The specific component is not limited to carbon black, but may be another component depending on the purpose. The specific member to be inspected is not limited to the constituent member M1, but may be the other constituent members M.

Next, a case where the distribution of the mass of the tire member R in the longitudinal direction L is determined as the predetermined quality to be inspected by the X-ray inspection device 3 will be described. This distribution can be determined in place of or in addition to the aforementioned magnitude of variation in the dimension in the width direction of the constituent member M1 in the longitudinal direction L.

In advance, the image data D described above is acquired under the same conditions for a large number of samples of the tire member R. Mass data per unit length of each of the samples is also acquired. By performing machine learning on the image data D and the mass data as teaching data, a prediction model (computer program) for estimating the mass per unit length of the predetermined length range C corresponding to the image data D is generated from the image data D acquired as the inspection object, and the prediction model is stored in the calculation device 4.

Since the contrast in the image data D changes depending on the thickness of the tire member R and the contained component therein as described above, the distribution of the contrast has a correlation with the mass per unit length of a portion (the predetermined length range C) of the tire member R, which corresponds to the image data D. Thus, for example, an estimation model is generated by subdividing the image data D into a large number of minute regions and obtaining, by using machine learning, the correlation between the degree of contrast of each of the minute regions, the position of each minute region, and the like and the mass per unit length corresponding to the image data D. Methods of machine learning that can be used include various known methods such as deep learning using a neural network.

In estimating the mass of each predetermined length range C of the tire member R being conveyed, the image data D sequentially acquired by the X-ray inspection device 3 is input to the estimation model and subjected to computational processing by the calculation device 4. Thus, the mass of each predetermined length range C is estimated and calculated.

Figure 9:
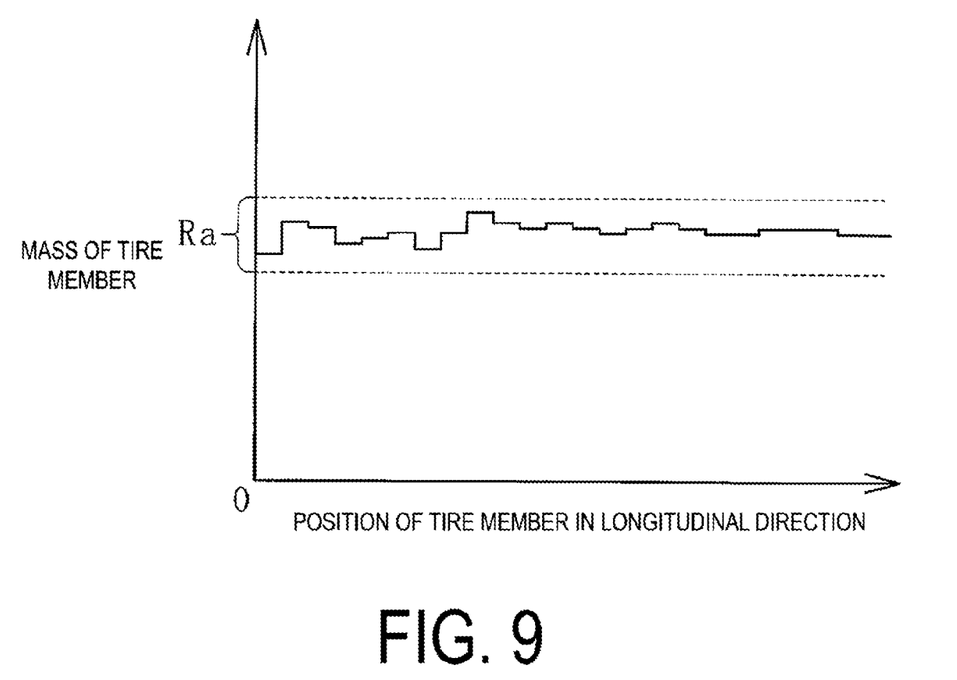
FIG. 9 is a graph illustrating the distribution in the longitudinal direction of the mass of the tire member.

As a result, as illustrated in FIG. 9, the magnitude of variation in the mass (mass per unit length) of the tire member R in the longitudinal direction L is calculated. Ra on the vertical axis of FIG. 9 indicates an allowable range of the mass (mass per unit length) of the tire member R, and according to FIG. 9, how much the mass of the manufactured tire member R varies in the longitudinal direction L can be determined. In FIG. 9, when the mass is within the allowable range Ra, the corresponding predetermined length range C is determined to be a non-defective portion. When the mass falls outside the allowable range Ra, the corresponding predetermined length range C is determined to be a defective portion.

In this embodiment, as in the preceding embodiment, the predetermined length range C corresponding to the non-defective portion is guided by the sorting conveyor 9 to the winding machine 7. The predetermined length range C corresponding to the defective portion is cut by the cutting machine 8 on the conveying device 2, guided by the sorting conveyor 9 to the discharge conveyor 10, and then removed from the manufacturing line.

The invention claimed is:

1. A quality inspection method for a tire member for determining predetermined quality of a tire member that is elongated and that is formed by bonding a plurality of types of constituent members, the quality inspection method comprising:
   continuously performing a process of applying X-rays to a predetermined length range of the tire member from a top surface side of the tire member while conveying the tire member in a longitudinal direction to acquire image data based on X-ray transmittance of the predetermined length range;
   acquiring the image data of the predetermined length range continuous without gaps in the longitudinal direction; and
   determining, based on contrast in each piece of the image data acquired, a magnitude of variation in the predetermined quality of the tire member in the longitudinal direction.

2. The quality inspection method for a tire member according to claim 1, wherein a distribution in the longitudinal direction of a dimension in a width direction of a specific constituent member of the constituent members, which is formed of unvulcanized rubber having a higher content rate of a specific component than those of unvulcanized rubber forming the other constituent members, is determined as the predetermined quality.

3. The quality inspection method for a tire member according to claim 2, wherein the specific component is carbon black.

4. The quality inspection method for a tire member according to claim 1, wherein a distribution in the longitudinal direction of a mass of the tire member is determined as the predetermined quality.

5. The quality inspection method for a tire member according to claim 2, wherein a distribution in the longitudinal direction of a mass of the tire member is determined as the predetermined quality.

6. The quality inspection method for a tire member according to claim 3, wherein a distribution in the longitudinal direction of a mass of the tire member is determined as the predetermined quality.

7. A quality inspection system for a tire member for determining predetermined quality of a tire member that is elongated and that is formed by bonding a plurality of types of constituent members, the quality inspection system comprising:

a conveying device configured to convey the tire member in a longitudinal direction;

an X-ray inspection device configured to apply X-rays to a predetermined length range of the tire member from a top surface side of the tire member being conveyed by the conveying device to acquire image data based on X-ray transmittance of the predetermined length range; and a calculation device to which the image data is input, the quality inspection system being configured such that a process of acquiring the image data is continuously performed, the image data of the predetermined length range continuous without gaps in the longitudinal direction is acquired, and based on contrast in each piece of the image data acquired, a magnitude of variation in the predetermined quality of the tire member in the longitudinal direction is calculated by the calculation device.

* * * * *